United States Patent
Baba

(10) Patent No.: US 8,267,834 B2
(45) Date of Patent: Sep. 18, 2012

(54) SELF-PROPELLED VEHICLE FOR CONVEYANCE AND METHOD OF CONTROLLING STOP THEREOF

(75) Inventor: Hiroyoshi Baba, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 362 days.

(21) Appl. No.: 12/740,420

(22) PCT Filed: Oct. 31, 2008

(86) PCT No.: PCT/JP2008/069916
§ 371 (c)(1),
(2), (4) Date: Apr. 29, 2010

(87) PCT Pub. No.: WO2009/057761
PCT Pub. Date: May 7, 2009

(65) Prior Publication Data
US 2011/0009238 A1    Jan. 13, 2011

(30) Foreign Application Priority Data

Oct. 31, 2007  (JP) .................................. 2007-283506

(51) Int. Cl.
B60W 10/08 (2006.01)
B60W 10/18 (2012.01)
(52) U.S. Cl. ........................................... 477/4; 477/185
(58) Field of Classification Search ............... 477/4, 185
See application file for complete search history.

(56) References Cited

U.S. PATENT DOCUMENTS

| 3,277,839 A * | 10/1966 | Conrad et al. ................ 104/155 |
| 2004/0204276 A1* | 10/2004 | Tarasinski ......................... 475/5 |
| 2006/0060450 A1* | 3/2006 | Iwai et al. .................. 198/465.1 |

FOREIGN PATENT DOCUMENTS

| JP | 64-026210 A | 1/1989 |
| JP | 01-300311 A | 12/1989 |
| JP | 05-178409 A | 7/1993 |
| JP | 10-187244 A | 7/1998 |
| JP | 11-305837 A | 11/1999 |
| JP | 2000-207023 A | 7/2000 |

* cited by examiner

Primary Examiner — Edwin A Young
(74) Attorney, Agent, or Firm — Kenyon & Kenyon LLP

(57) ABSTRACT

A self-propelled vehicle for conveyance that can be safely stopped without deviating from a predetermined route when an obstacle is detected during running, and a method of controlling a stop of the self-propelled vehicle for conveyance are provided. The method of controlling the stop of the self-propelled vehicle for conveyance includes a second detection step in which an obstacle located at a set distance is detected during the running of the self-propelled vehicle for conveyance, and a stop step in which a leftward or rightward positional deviation of the self-propelled vehicle for conveyance from the predetermined route is correctively controlled in the state where brake means for a pair of left and right driving wheels are released and the self-propelled vehicle for conveyance is stopped, when the positional deviation turns out to be present on the basis of detection of the obstacle in the second detection step. Therefore, when the obstacle is detected during the running of the self-propelled vehicle for conveyance, the self-propelled vehicle for conveyance is safely stopped without deviating from the predetermined route.

8 Claims, 4 Drawing Sheets

F I G. 1
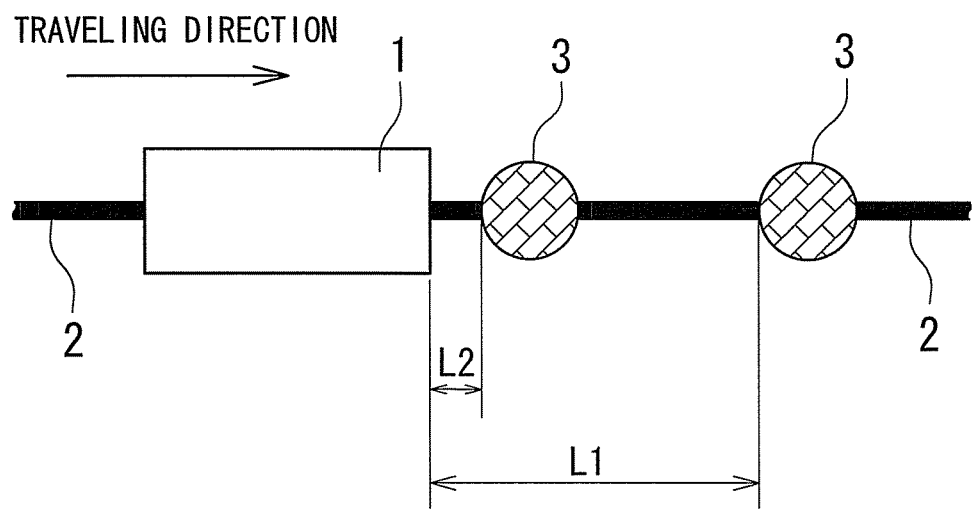
F I G. 2
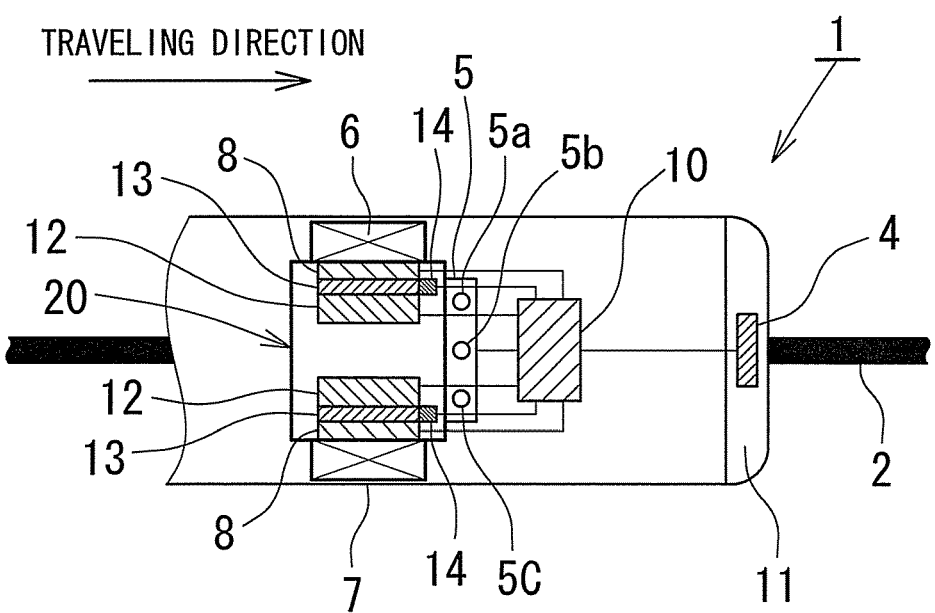

SELF-PROPELLED VEHICLE FOR CONVEYANCE AND METHOD OF CONTROLLING STOP THEREOF

This is a 371 national phase application of PCT/JP2008/069916 filed 31 Oct. 2008, claiming priority to Japanese Patent Application No. JP 2007-283506 filed 31 Oct. 2007, the contents of which are incorporated herein by reference.

FIELD OF THE INVENTION

The present invention relates to a self-propelled vehicle for conveyance that is removably or integrally coupled to a carriage and runs in a self-propelled manner along guide means disposed on a predetermined route, and a method of controlling a stop of the self-propelled vehicle for conveyance.

BACKGROUND OF THE INVENTION

There are conventionally known a traction-type self-propelled vehicle that is removably coupled to a carriage on which pieces of work, luggage and the like are laid and runs in a self-propelled manner along a predetermined route with the aid of guide means such as magnetic information or the like set on a floor surface while towing the carriage, an onboard-type self-propelled vehicle that is integrally coupled to a carriage on which pieces of work, luggage and the like are laid and runs in a self-propelled manner along a predetermined route with the aid of the guide means, and the like.

In recent years, there has been an ever-increasing tendency to make use of self-propelled vehicles for conveyance as described above. There is a demand for speed-up (to about 80 m/min) for the sake of efficiency enhancement. At the same time, there is also a demand for a guarantee of safety from speed-up. When an obstacle or the like is detected on a predetermined route while a self-propelled vehicle for conveyance runs at high speed, it is indispensable to swiftly stop the self-propelled vehicle for conveyance on the predetermined route.

Thus, a method of controlling a stop of a self-propelled vehicle for conveyance of related art will be described.

The self-propelled vehicle for conveyance of related art is equipped with an obstacle detection sensor capable of detecting an obstacle in a non-contact manner, a stop control device that decelerates/stops, on the basis of the detection by the obstacle sensor, a pair of left and right driving wheels that rotate independently of each other, and a safety bumper that shuts off the transmission of power to the self-propelled vehicle for conveyance upon contact with the obstacle.

In the stop control method of related art, first of all, the obstacle detection sensor detects an obstacle located at a predetermined distance during the running of the self-propelled vehicle for conveyance.

After that, on the basis of the detection by the obstacle detection sensor, the stop control device sets command rotational speeds for the pair of the left and right driving wheels to those in a stop mode (0 rpm for both the left and right driving wheels). The self-propelled vehicle for conveyance is thereby gradually decelerated and stopped.

However, in the case where the self-propelled vehicle for conveyance runs at high speed, even when the stop control device sets the command rotational speeds for the respective driving wheels to those in the stop mode, a stop braking distance after the detection of the obstacle becomes long. Therefore, the self-propelled vehicle for conveyance cannot be stopped in front of the obstacle.

That is, in the stop control method of related art, the self-propelled vehicle for conveyance is naturally decelerated and stopped through stop control in the stop mode for the respective driving wheels, namely, through the setting of the command rotational speeds for the respective driving wheels to those in the stop mode (0 rpm for both the left and right driving wheels) and with the aid of the friction or the like between a floor surface and respective driven wheels of a carriage and the driving wheels of the self-propelled vehicle for conveyance. Therefore, especially when the self-propelled vehicle for conveyance runs at high speed, the stop braking distance of the self-propelled vehicle for conveyance after the detection of the obstacle becomes long, and the self-propelled vehicle for conveyance cannot be stopped in front of the obstacle.

Thus, in the stop control method of related art, when the self-propelled vehicle for conveyance runs at high speed, the transmission of the power to the self-propelled vehicle for conveyance is shut off to completely stop the self-propelled vehicle for conveyance as soon as the safety bumper of the self-propelled vehicle for conveyance comes into contact with the obstacle.

As described above, in the aforementioned method of controlling the stop of the self-propelled vehicle for conveyance of related art, when the self-propelled vehicle for conveyance is caused to run at high speed, the stop braking distance of the self-propelled vehicle for conveyance after the detection of the obstacle by the obstacle detection sensor is long, and the transmission of the power to the self-propelled vehicle for conveyance is shut off to completely stop the self-propelled vehicle for conveyance as soon as the safety bumper of the self-propelled vehicle for conveyance comes into contact with the obstacle. Therefore, especially in some cases including a case where a heavy object is laid on the carriage on the self-propelled vehicle for conveyance, a very dangerous situation lasts over a long zone from a spot corresponding to the detection of the obstacle to a spot corresponding to a complete stop of the self-propelled vehicle for conveyance resulting from its contact with the obstacle. Thus, in related art, the maximum speed of the self-propelled vehicle for conveyance is limited to guarantee safety.

Thus, as a related art for solving the aforementioned problem, Patent Document 1 describes that an electromagnetic brake (a mechanical brake) and an electric brake are both employed to shorten a stop braking distance of an automatic conveyance vehicle as emergency stop control for the automatic conveyance vehicle.

Patent Document 1: Japanese Patent Application Publication No. JP-A-1-26210

SUMMARY OF THE INVENTION

[Problem to be Solved by the Invention]

However, when an attempt is made to shorten the stop braking distance of the self-propelled vehicle for conveyance by employing both the mechanical brake and the electric brake as in the case of the present invention disclosed in Patent Document 1, the respective driving wheels of the self-propelled vehicle for conveyance are locked and slip, thereby giving rise to a possibility of the self-propelled vehicle for conveyance stopping after deviating from the predetermined route. Besides, especially in the case of the traction-type self-propelled vehicle, when the self-propelled vehicle for conveyance slips, deviates from the predetermined route, and stops, the carriage coupled to the self-propelled vehicle for conveyance may separate therefrom and run due to a remaining acceleration of the carriage, thereby causing a very dangerous situation.

Furthermore, when the self-propelled vehicle for conveyance deviates from the predetermined route and stops, it is very difficult to perform a recovery operation of putting the self-propelled vehicle for conveyance back on the predetermined route because the self-propelled vehicle for conveyance is designed to automatically run.

The present invention has been made in view of the aforementioned circumstances. It is an object of the present invention to provide a self-propelled vehicle for conveyance that can be safely stopped without deviating from a predetermined route when an obstacle is detected during running, and a method of controlling a stop of the self-propelled vehicle for conveyance.

[Means for Solving the Problem]

In order to solve the aforementioned problem, a method of controlling a stop of a self-propelled vehicle for conveyance according to the present invention is a method of controlling a stop of a self-propelled vehicle for conveyance that is equipped with a pair of left and right driving wheels (6, 7), drive motors (12, 12) coupled to the respective driving wheels, and brake devices (8, 8) for braking rotation of the respective driving wheels, is removably or integrally coupled to a carriage, and runs in a self-propelled manner along guide means disposed on a predetermined route. This method is characterized by including the steps of detecting an obstacle located at a set distance while the self-propelled vehicle for conveyance is running (S30), and stopping the self-propelled vehicle for conveyance (S40). This method is also characterized in that the stop step includes the steps of operating the brake devices and electric brakes realized by the drive motors on a basis of detection of the obstacle in the detection step (S1), detecting a leftward or rightward positional deviation of the self-propelled vehicle for conveyance from the predetermined route (S3, S5), and correcting the positional deviation by temporarily releasing operation of the brake devices and the electric brakes realized by the drive motors and making command rotational speeds for the respective drive motors different from each other when the positional deviation is detected (S4, S6).

Further, in order to solve the aforementioned problem, a self-propelled vehicle for conveyance according to the present invention is characterized by including: a pair of left and right driving wheels (6, 7) that rotate independently of each other; drive motors (12, 12) coupled to the respective driving wheels; brake devices (8, 8) that brake rotation of the respective driving wheels; an obstacle detection sensor (4) that detects an obstacle located at a predetermined distance; a positional deviation detection sensor (5) that detects a leftward or rightward positional deviation of the self-propelled vehicle for conveyance from the predetermined route; and a stop control device (10) that operates the brake devices and electric brakes realized by the drive motors on the basis of detection of the obstacle by the obstacle detection sensor, and corrects a leftward or rightward positional deviation of the self-propelled vehicle for conveyance from the predetermined route by temporarily releasing operation of the brake devices and the electric brakes realized by the drive motors and making command rotational speeds for the respective drive motors different from each other and stops the self-propelled vehicle for conveyance when the positional deviation detection sensor detects the positional deviation.

Thus, when the obstacle located at the predetermined distance is detected during the running of the self-propelled vehicle for conveyance, the self-propelled vehicle for conveyance is safely stopped without deviating from the predetermined route.

It should be noted that various exemplary forms of the self-propelled vehicle for conveyance according to the present invention and the method of controlling the stop thereof and the operations of those exemplary forms will be described in detail in the following items for the exemplary forms of the present invention.

(Exemplary Forms of the Invention)

Hereinafter, exemplary forms of the present invention considered claimable in the present application (sometimes referred to as a claimable invention below) will be described. The forms are divided into items similar to the claims, and each item is assigned with a number and may cite the number of other items as necessary. This format is only intended to facilitate understanding of the claimable invention, and the combinations of structural elements that constitute the claimable invention are not limited to those described the following items. In other words, the claimable invention should be interpreted in consideration of the descriptions accompanying each item, the embodiments, and the like. Forms that add other structural elements to or omit structural elements from the forms in the items are also considered to be forms of the claimable invention, provided that they conform to such interpretations. Note that, in the following items (1) to (9), the forms in items (1) to (5) correspond to claims 1, 2, 3, 7 and 8, respectively, and the forms in items (7) to (9) correspond to claims 4 to 6, respectively.

(1) A method of controlling a stop of a self-propelled vehicle for conveyance that is equipped with a pair of left and right driving wheels (6, 7), drive motors (12, 12) coupled to the respective driving wheels, and brake devices (8, 8) for braking rotation of the respective driving wheels, is removably or integrally coupled to a carriage, and runs in a self-propelled manner along guide means disposed on a predetermined route is characterized by including the steps of: detecting an obstacle located at a set distance while the self-propelled vehicle for conveyance is running (S30), and stopping the self-propelled vehicle for conveyance (S40), and is characterized in that the stop step includes the steps of operating the brake devices and electric brakes realized by the drive motors on the basis of detection of the obstacle in the detection step (S1), detecting a leftward or rightward positional deviation of the self-propelled vehicle for conveyance from the predetermined route (S3, S5), and correcting the positional deviation by temporarily releasing the operation of the brake devices and the electric brakes realized by the drive motors and making command rotational speeds for the respective drive motors different from each other when the positional deviation is detected (S4, S6).

Accordingly, in the method of controlling the stop of the self-propelled vehicle for conveyance according to the item (1), upon detection of the obstacle located at the set distance in the detection step during the running of the self-propelled vehicle for conveyance, the leftward or rightward positional deviation of the self-propelled vehicle for conveyance from the predetermined route is correctively controlled after temporarily releasing the operation of the brake devices and the electric brakes realized by the drive motors for the respective driving wheels, and the operation of the brake devices and the electric brakes realized by the drive motors for the respective driving wheels is thereafter resumed to stop the self-propelled vehicle for conveyance when the positional deviation turns out to be present in the stop step. Therefore, the self-propelled vehicle for conveyance is safely stopped without deviating from the predetermined route.

Besides, in the method of controlling the stop of the self-propelled vehicle for conveyance according to the item (1), the positional deviation of the self-propelled vehicle for conveyance is correctively controlled after releasing the operation of the brake devices and the electric brakes realized by the drive motors for the respective driving wheels in the stop step. Therefore, the positional deviation can be easily corrected.

(2) The method of controlling the stop of the self-propelled vehicle for conveyance according to the item (1) is characterized in that the stop step further includes the step (S7) of temporarily releasing the operation of the brake devices and the electric brakes realized by the drive motors and intermittently operating the brake devices and the electric brakes realized by the drive motors in the state where the self-propelled vehicle for conveyance is decelerated when differences between actually measured rotational speeds of the respective driving wheels and the command rotational speeds for the respective drive motors are larger than a reference value and the positional deviation is not detected.

Accordingly, in the method of controlling the stop of the self-propelled vehicle for conveyance according to the item (2), especially when the differences between the actually measured rotational speeds of the respective driving wheels and the command rotational speeds for the respective drive motors are larger than the reference value and there is no positional deviation of the self-propelled vehicle for conveyance, the operation of the brake devices and the electric brakes realized by the drive motors is temporarily released, and then the brake devices and the electric brakes realized by the drive motors are intermittently operated in the state where the self-propelled vehicle for conveyance is decelerated. Therefore, the respective driving wheels are prevented from being locked to slip to the extent of disabling the posture control of the self-propelled vehicle for conveyance. As a result, the stop braking distance of the self-propelled vehicle for conveyance after the detection of the obstacle can be made shorter than before.

(3) The method of controlling the stop of the self-propelled vehicle for conveyance according to the item (1) is characterized in that in the step (S6) of correcting the positional deviation, the positional deviation is corrected by setting the command rotational speeds for the respective drive motors lower than the actually measured rotational speeds and making the command rotational speeds for the respective drive motors different from each other when differences between the actually measured rotational speeds of the respective driving wheels and the command rotational speeds for the respective drive motors are larger than a reference value.

(4) The method of controlling the stop of the self-propelled vehicle for conveyance according to the item (1) is characterized in that in the step (S4) of correcting the positional deviation, the positional deviation is corrected by setting the command rotational speed for one of the drive motors to zero and setting the command rotational speed for the other drive motor lower than the actually measured rotational speed thereof when differences between actually measured rotational speeds of the respective driving wheels and the command rotational speeds for the respective drive motors are smaller than a reference value.

(5) Further, the method of controlling the stop of the self-propelled vehicle for conveyance according to any one of the items (1) to (4) is characterized by further including: the step (S10) of: detecting the obstacle at a set distance longer than the set distance in the detection step; and the step (S20) of causing the self-propelled vehicle for conveyance to run at low speed by decelerating the self-propelled vehicle for conveyance based on detection of the obstacle in case of the long distance-side detection step.

Accordingly, the method of controlling the stop of the self-propelled vehicle for conveyance according to the item (5) is especially effective when the self-propelled vehicle for conveyance is caused to run at high speed. Prior to the stop step, the self-propelled vehicle for conveyance is sufficiently decelerated and caused to run at low speed.

(6) The method of controlling the stop of the self-propelled vehicle for conveyance according to any one of the items (1) to (5) is characterized in that the set distance in the detection step is set longer than the stop braking distance of the self-propelled vehicle for conveyance in the stop step.

Accordingly, in the method of controlling the stop of the self-propelled vehicle for conveyance according to the item (6), the self-propelled vehicle for conveyance is stopped in front of the obstacle without coming into contact with the obstacle in the stop step.

(7) Further, the method of controlling the stop of the self-propelled vehicle for conveyance according to any one of the items (1) to (5) is characterized by further including the step of making an emergency stop of the self-propelled vehicle for conveyance where the self-propelled vehicle for conveyance is adapted not to stop in front of the obstacle due to the stop step, but when the self-propelled vehicle for conveyance is in contact with the obstacle, the self-propelled vehicle for conveyance is adapted to stop by shutting off transmission of power to the self-propelled vehicle for conveyance.

Accordingly, in the method of controlling the stop of the self-propelled vehicle for conveyance according to the item (7), the emergency stop step is provided as a failsafe function. In the case where the self-propelled vehicle for conveyance does not stop before coming into contact with the obstacle in the stop step, the transmission of the power to the self-propelled vehicle for conveyance is shut off to stop the self-propelled vehicle for conveyance as soon as the safety bumper of the self-propelled vehicle for conveyance comes into contact with the obstacle in the emergency stop step.

(8) A self-propelled vehicle for conveyance that is removably or integrally coupled to a carriage and runs in a self-propelled manner along guide means disposed on a predetermined route is characterized by including: a pair of left and right driving wheels (6, 7) that rotate independently of each other; drive motors (12, 12) coupled to the respective driving wheels; brake devices (8, 8) that brake rotation of the respective driving wheels; an obstacle detection sensor (4) that detects an obstacle located at a predetermined distance; a positional deviation detection sensor (5) that detects a leftward or rightward positional deviation of the self-propelled vehicle for conveyance from the predetermined route; and a stop control device (10) that operates the brake devices and electric brakes realized by the drive motors on the basis of detection of the obstacle by the obstacle detection sensor, and corrects a leftward or rightward positional deviation of the self-propelled vehicle for conveyance from the predetermined route by temporarily releasing operation of the brake devices and the electric brakes realized by the drive motors and making command rotational speeds for the respective drive motors different from each other and stops the self-propelled vehicle for conveyance when the positional deviation detection sensor detects the positional deviation.

Accordingly, in the self-propelled vehicle for conveyance according to the item (8), when a leftward or rightward positional deviation of the self-propelled vehicle for conveyance from the predetermined route turns out to be present on the basis of the contents of detection from the positional deviation detection sensor upon detection of the obstacle by the obstacle detection sensor, the stop control device corrects the positional deviation in the state where the operation of the brake devices and the electric brakes realized by the drive motors is temporarily released, and thereafter resumes the operation of the brake devices and the electric brakes realized by the drive motors to stop the self-propelled vehicle for conveyance.

(9) The self-propelled vehicle for conveyance according to the item (8) is characterized in that the positional deviation detection sensor is provided at a front or rear portion, in a traveling direction, of a driving wheel unit in which the respective driving wheels are integrally formed, and is constructed by arranging in series a plurality of detection elements for detecting the guide means substantially perpendicularly to a direction in which the guide means extends.

Accordingly, in the self-propelled vehicle for conveyance according to the item (9), the positional deviation sensor is constructed by arranging in series the plurality of the detection elements perpendicularly to the direction in which the guide means extends. Therefore, when the self-propelled vehicle for conveyance normally runs on the guide means, only the central one of the respective detection elements is ON. For example, when the self-propelled vehicle for conveyance runs with its position deviating rightward from the predetermined route, only the left one of the respective detection elements is ON.

(10) The self-propelled vehicle for conveyance according to the item (8) or (9) is characterized by including a safety bumper that shuts off the transmission of the power to the self-propelled vehicle for conveyance upon contact with the obstacle.

Accordingly, in the self-propelled vehicle for conveyance according to the item (10), the safety bumper is provided as a failsafe function. When the self-propelled vehicle for conveyance does not stop in front of the obstacle for some reason despite the operation of the stop control device, the transmission of the power to the self-propelled vehicle for conveyance is shut off to stop the self-propelled vehicle for conveyance as soon as the safety bumper of the self-propelled vehicle for conveyance comes into contact with the obstacle.

[Effect of the Invention]

According to the present invention, a self-propelled vehicle for conveyance that is safely stopped without deviating from a predetermined route upon detection of an obstacle during running, and a method of controlling a stop of the self-propelled vehicle for conveyance can be provided.

BRIEF DESCRIPTION OF THE DRAWINGS

FIG. 1 is a view showing how a self-propelled vehicle for conveyance according to an embodiment of the present invention is opposed to an obstacle.

FIG. 2 is a schematic view of the self-propelled vehicle for conveyance according to the embodiment of the present invention.

Figure 3:
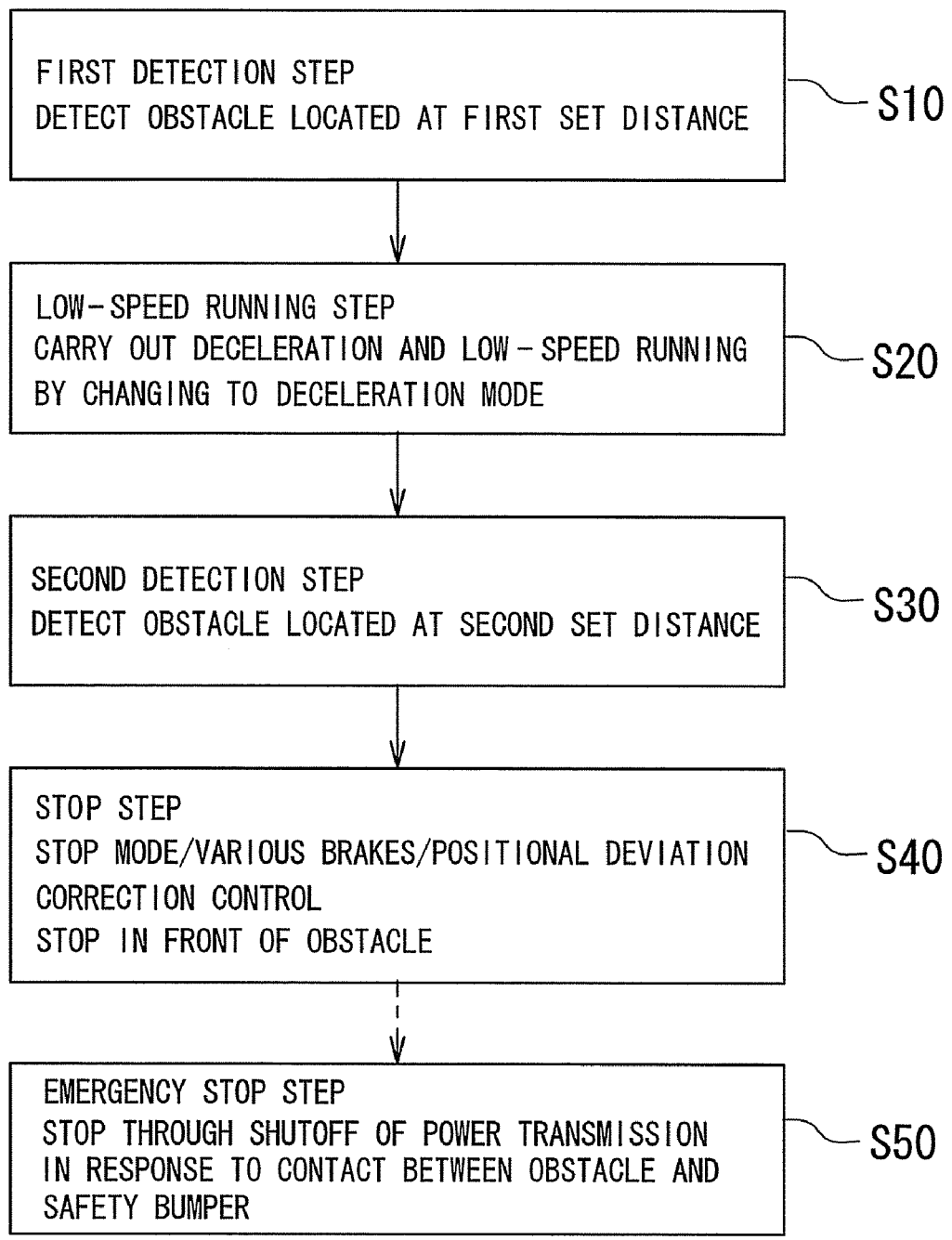
FIG. 3 is a flowchart showing a method of controlling a stop of the self-propelled vehicle for conveyance according to the embodiment of the present invention.

DESCRIPTION OF REFERENCE SYMBOLS 1 self-propelled vehicle for conveyance, 2 running magnetic tape (guide means), 3 obstacle, 4 obstacle detection sensor, 5 positional deviation detection sensor, 5a to 5c detection elements, 6 (left) driving wheel, 7 (right) driving wheel, 8 disc brakes (brake device), 10 stop control device, 12 drive motors, 14 rotational speed measurement sensors, 20 driving wheel unit A best mode for carrying out the present invention will be described hereinafter in detail on the basis of FIGS. 1 to 6.

As shown in FIGS. 1 and 2, a self-propelled vehicle 1 for conveyance according to the embodiment of the present invention is removably or integrally coupled to a carriage (not shown) on which pieces of work, luggage and the like are laid, and runs in a self-propelled manner along a running magnetic tape (guide means) 2 set on a predetermined route of a floor surface. The self-propelled vehicle 1 for conveyance is equipped with: an obstacle detection sensor 4 that detects an obstacle 3 located at a predetermined distance; a positional deviation detection sensor 5 that detects a leftward or rightward positional deviation of the self-propelled vehicle 1 for conveyance from the predetermined route; disc brakes (brake devices) 8 and 8 coupled to a pair of left and right driving wheels 6 and 7 that rotate independently of each other so as to brake the rotation thereof; a stop control device 10 that correctively controls a leftward or rightward positional deviation of the self-propelled vehicle 1 for conveyance from the predetermined route in the state where the disc brakes 8 and 8 and electric brakes for the respective driving wheels 6 and 7 are released, and stops the self-propelled vehicle 1 for conveyance when the positional deviation turns out to be present on the basis of the contents of detection from the positional deviation detection sensor 5 upon detection of the obstacle 3 by the obstacle detection sensor 4; and a safety bumper 11 that is installed at a front portion in a traveling direction to shut off the transmission of power to the self-propelled vehicle 1 for conveyance upon contact with the obstacle 3.

Further, this self-propelled vehicle 1 for conveyance is equipped with respective reduction gears 13 and 13 disposed between the pair of the left and right driving wheels 6 and 7 and respective drive motors 12 and 12, and rotational speed measurement sensors 14 and 14 disposed opposite respective teeth of the respective reduction gears 13 and 13 to measure rotational speeds of the respective driving wheels 6 and 7.

The self-propelled vehicle 1 for conveyance according to the embodiment of the present invention will be described in detail.

As shown in FIG. 2, this self-propelled vehicle 1 for conveyance is equipped with a single driving wheel unit 20, and this driving wheel unit 20 is equipped with the pair of the left and right driving wheels 6 and 7 that rotate independently of each other.

The driving wheel unit 20 is equipped with the drive motors 12 and 12, which are coupled to the respective driving wheels 6 and 7, in combination with motor drivers respectively. The respective drive motors 12 and 12 are connected to the stop control device 10, and are driven in accordance with command rotational speeds from the stop control device 10 during stop control. The pair of the left and right driving wheels 6 and 7 rotate independently of each other.

The disc brakes 8 and 8 are coupled respectively to the respective driving wheels 6 and 7. The disc brakes 8 and 8 clamp discs rotating together with the respective driving wheels 6 and 7 from both sides thereof to brake the rotation of the respective driving wheels 6 and 7. The respective disc brakes 8 and 8 are connected to the stop control device 10. During stop control, an operation signal or a release signal is transmitted from the stop control device 10 to the respective disc brakes 8 and 8.

Further, the driving wheel unit 20 is equipped, between the respective driving wheels 6 and 7 and the respective drive motors 12 and 12, with the reduction gears 13 and 13 that convert rotational speeds of the respective drive motors 12 and 12 into suitable rotational speeds and transmit these rotational speeds to the respective driving wheels 6 and 7. The rotational speed measurement sensors 14 and 14 that measure rotational speeds of the respective driving wheels 6 and 7 are installed at positions opposite the respective teeth of the respective reduction gears 13 and 13. The respective rotational speed measurement sensors 14 and 14 are connected to the stop control device 10. During stop control, the contents of measurement of the respective rotational speed measurement sensors 14 and 14 are constantly transmitted to the stop control device 10.

Further, during normal running, the self-propelled vehicle 1 for conveyance runs while finely adjusting the orientation thereof by making rotational speeds of the respective driving wheels 6 and 7 of the driving wheel unit 20 different from each other on the basis of the contents of detection of the positional deviation detection sensor 5, which will be described later in detail.

As shown in FIG. 2, the obstacle detection sensor 4 is installed at the front portion of the self-propelled vehicle 1 for conveyance in the traveling direction to detect the obstacle 3 in a non-contact manner. More specifically, the obstacle detection sensor 4 detects the obstacle 3 located at a predetermined distance by irradiating the obstacle 3 with laser beams, LED beams, ultrasound waves or the like and receiving waves reflected by the obstacle 3.

The obstacle detection sensor 4 installed on this self-propelled vehicle 1 for conveyance is connected to the stop control device 10, and is designed to transmit its detection signals to the stop control device 10 at a timing when the obstacle 3 located at a first set distance L1 shown in FIG. 1 is detected while the self-propelled vehicle 1 for conveyance is running and at a timing when the distance from the obstacle 3 becomes close to a second set distance L2 (<the first set distance L1) after the self-propelled vehicle 1 for conveyance has continued to run. The second set distance L2 is set slightly longer than a stop braking distance L4 (see FIG. 6) of the self-propelled vehicle 1 for conveyance in a stop step S40 of a later-described stop control method.

Figure 5:
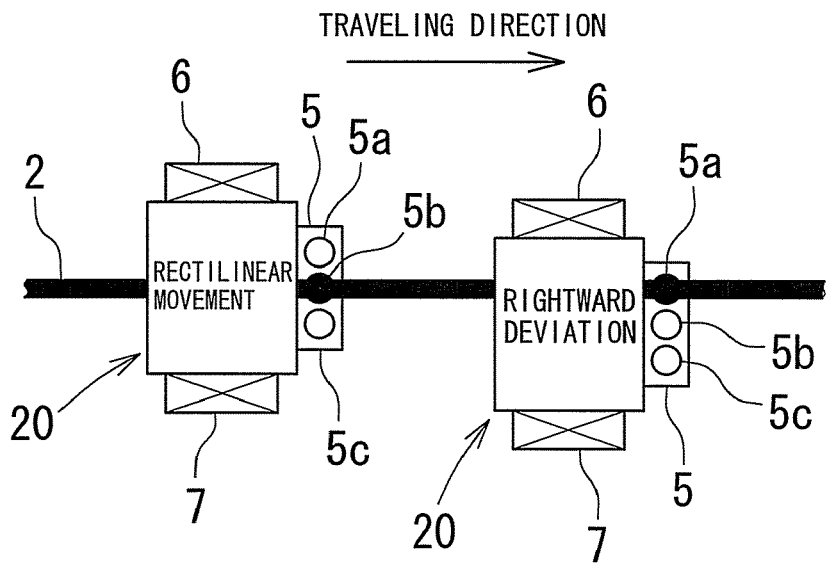
FIG. 5 is a schematic view showing how a leftward or rightward positional deviation of the self-propelled vehicle for conveyance according to the embodiment of the present invention from a predetermined route is detected.

As shown in FIGS. 2 and 5, the positional deviation detection sensor 5 is installed at a front portion of the driving wheel unit 20 in the traveling direction, and is constructed by arranging in series a plurality of (three in this embodiment of the present invention) detection elements 5a to 5c for detecting the running magnetic tape 2 perpendicularly to a direction in which the running magnetic tape 2 extends. It should be noted that the positional deviation detection sensor 5 may be installed at a rear portion of the driving wheel unit 20 in the traveling direction.

This positional deviation detection sensor 5 is connected to the stop control device 10. During stop control, when the positional deviation detection sensor 5 detects a positional deviation of the self-propelled vehicle 1 for conveyance, the contents of the detection are transmitted to the stop control device 10. The stop control device 10 then corrects the positional deviation of the self-propelled vehicle 1 for conveyance by driving the respective driving wheels 6 and 7 after making their command rotational speeds different from each other on the basis of the contents of the detection. This correction control will be described in detail in describing the stop control method.

As shown in FIG. 2, the stop control device 10 is connected respectively to the obstacle detection sensor 4, the positional deviation detection sensor 5, the respective rotational speed measurement sensors 14 and 14, the respective drive motors 8 and 8, the disc brakes 14 and 14, and the electric brakes. When a leftward or rightward positional deviation of the self-propelled vehicle 1 for conveyance from the predetermined route turns out to be present on the basis of the contents of detection from the positional deviation detection sensor 5 upon detection of the obstacle 3 by the obstacle detection sensor 4, the stop control device 10 correctively controls the positional deviation in the state where the disc brakes 8 and 8 and electric brakes for the respective driving wheels 6 and 7 released, and stops the self-propelled vehicle 1 for conveyance. This operation of the stop control device 10 will be described in detail in describing the stop control method. It should be noted that the electric brakes cause rotational resistances in the respective drive motors 8 and 8 to obtain braking forces thereof through the inverse inputting of rotation on the respective driving wheels 6 and 7 sides to the respective drive motors 8 and 8 by the stop control device 10.

The safety bumper 11 is installed at the front portion of the self-propelled vehicle 1 for conveyance in the traveling direction. The safety bumper 11 has a built-in contact detection circuit. When the obstacle 3 comes into contact with the safety bumper 11 to short-circuit the contact detection circuit, the resistance value in the contact detection circuit changes. An abnormality in the safety bumper 11 is detected by detecting a change in this resistance value.

The contact detection circuit in the safety bumper 11 is connected to a power source that transmits power for the self-propelled vehicle 1 for conveyance. When the resistance value of the contact detection circuit in the safety bumper 11 changes, the transmission of the power to the self-propelled vehicle 1 for conveyance is shut off. It should be noted that a short-circuit contact for self-diagnosis is incorporated with this contact detection circuit so that a self-diagnosis of the operation of shutting off the transmission of the power to the self-propelled vehicle 1 for conveyance can be carried out by turning this short-circuit contact ON.

Next, the stop control method in the case where this self-propelled vehicle 1 for conveyance constructed as described above is caused to run at a high speed (80 m/min) will be described on the basis of FIGS. 3 to 6 and with reference to FIG. 1 as well.

First of all in a first detection step (a long distance-side detection step) S10, during the running of the self-propelled vehicle 1 for conveyance at the high speed, the obstacle detection sensor 4 detects the obstacle 3 located at the first set distance L1 and transmits a detection signal to the stop control device 10. The process then proceeds to a subsequent low-speed running step S20.

Then in the low-speed running step S20, as soon as the detection signal is transmitted from the obstacle detection sensor 4 to the stop control device 10, command rotational speeds for the respective drive motors 12 and 12 (the respective driving wheels 6 and 7) from the stop control device 10 are changed from rotational speeds corresponding to the current running speed of the self-propelled vehicle 1 for conveyance to rotational speeds corresponding to a deceleration mode, for example, a running speed of 10 m/min. After having been decelerated, the self-propelled vehicle 1 for conveyance is caused to run at a low speed. The process then proceeds to a subsequent second detection step S30.

Then in the second detection step (a detection step) S30, when the distance from the obstacle 3 becomes close to the second set distance L2 during the running of the self-propelled vehicle 1 for conveyance at the low speed, the obstacle detection sensor 4 detects the obstacle 3 again and transmits a detection signal to the stop control device 10. The process then proceeds to a subsequent stop step S40.

It should be noted that the process proceeds to the subsequent stop step S40 due to the detection of the obstacle 3 by the obstacle detection sensor 4 even when the distance from the obstacle 3 becomes close to the second set distance L2 in a situation where the self-propelled vehicle 1 for conveyance cannot be decelerated to a command speed (e.g., 10 m/min) in the deceleration mode for some reason, for example, as a result of a sudden appearance of the obstacle on a running course or the like, in the low-speed running step S20.

Figure 4:
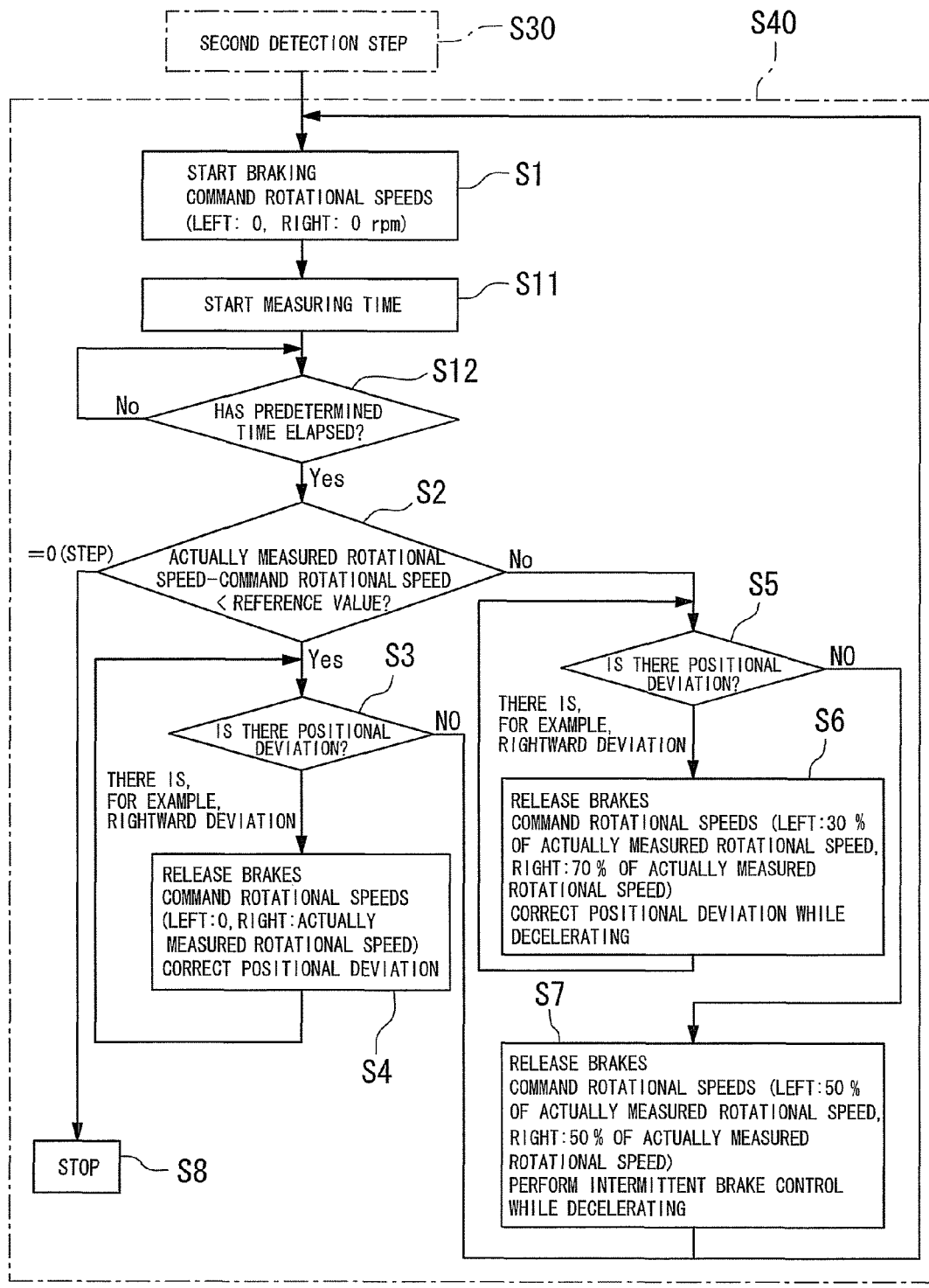
FIG. 4 is a flowchart of a stop step of the method of controlling the stop of the self-propelled vehicle for conveyance according to the embodiment of the present invention.

Next, in the stop step S40, the following operation flow is carried out (see FIG. 4 in particular).

That is, in the stop step S40, as soon as a detection signal is transmitted from the obstacle detection sensor 4 to the stop control device 10 in the second detection step S30, the command rotational speeds from the stop control device 10 to the respective drive motors 12 and 12 (the respective driving wheels 6 and 7) are changed to those in the stop mode (0 rpm for both the left and right driving wheels 6 and 7) in a first step S1, and at the same time, an operation signal is transmitted from the stop control device 10 to the electric brakes and the disc brakes 8 and 8 to operate the electric brakes and the disc brakes 8 and 8. Then, the measurement of a time is started in a step S11, and after the lapse of a predetermined time is confirmed in a step S12, the process proceeds to a second step S2. It should be noted that actually measured rotational speeds of the respective driving wheels 6 and 7 measured by the respective rotational speed measurement sensors 14 and 14 are constantly transmitted to the stop control device 10.

Then in the second step S2, the stop control device 10 calculates a difference between the respective actually measured rotational speeds of the respective driving wheels 6 and 7 (the respective actually measured rotational speeds of the respective driving wheels 6 and 7 are substantially the same value) and the command rotational speeds (0 rpm for both the left and right driving wheels 6 and 7 in the stop mode) for the respective drive motors 12 and 12 (the respective driving wheels 6 and 7). When this difference is larger than a preset reference value, the process proceeds to a fifth step S5. When this difference is smaller than the reference value, the process proceeds to a third step S3. This reference value is appropriately on the basis of the weight or the like of pieces of work and the like laid on the carriage.

Then in the third step S3, it is determined on the basis of the contents of detection transmitted from the positional deviation detection sensor 5 whether or not there is a positional deviation of the self-propelled vehicle 1 for conveyance from the predetermined route. When it is determined as a result that there is no positional deviation of the self-propelled vehicle 1 for conveyance, the electric brakes and the respective disc brakes 8 and 8 continue to be operated, and the process proceeds to the second step S2.

On the other hand, when it is determined as a result in the third step S3 that there is, for example, a rightward positional deviation of the self-propelled vehicle 1 for conveyance from the predetermined route, the process proceeds to a fourth step S4.

That is, when there is a rightward positional deviation of the self-propelled vehicle 1 for conveyance from the predetermined route as shown in, for example, FIG. 5 due to slippage or the like through the operation of the brakes while the self-propelled vehicle 1 for conveyance is being decelerated in the course of the stop, a detection state of the detection elements 5*a* to 5*c* of the positional deviation detection sensor 5 is changed from a normal running state where the central detection element 5*b* is ON to a state where the left detection element 5*a* is ON. It is determined from this detection state that there is a rightward positional deviation of the self-propelled vehicle 1 for conveyance.

Then in the fourth step S4, a release signal is transmitted from the stop control device 10 to the electric brakes and the respective disc brakes 8 and 8 to release the electric brakes and the respective disc brakes 8 and 8. At the same time, in order to correct the positional deviation of the self-propelled vehicle 1 for conveyance, the command rotational speeds from the stop control device 10 to the respective drive motors 12 and 12 (the respective driving wheels 6 and 7) are changed from those in the stop mode (0 rpm for both the left and right driving wheels 6 and 7) to 0 rpm for the left driving wheel 6 and the actually measured rotational speed for the right driving wheel 7. After that, the process returns to the third step S3 so as to determine whether or not there is a positional deviation of the self-propelled vehicle 1 for conveyance from the predetermined route. Based on a result of the determination, the process proceeds to the subsequent fourth step S4 (in which the positional deviation is corrected) or to the first step S1 (in which the brakes are re-operated).

Further, in the fifth step S5, as is the case with the third step S3, the stop control device 10 determines on the basis of the contents of detection transmitted from the positional deviation detection sensor 5 whether or not there is a positional deviation of the self-propelled vehicle 1 for conveyance from the predetermined route. When it is determined as a result that there is no positional deviation of the self-propelled vehicle 1 for conveyance, the process proceeds to a seventh step S7.

On the other hand, when it is determined in the fifth step S5 that there is, for example, a rightward positional deviation of the self-propelled vehicle 1 for conveyance from the predetermined route, the process proceeds to a sixth step S6.

In the sixth step S6, a release signal is transmitted from the stop control device 10 to the electric brakes and the respective disc brakes 8 and 8 to release the electric brakes and the respective disc brakes 8 and 8. At the same time, in order to correct the positional deviation while gently decelerating the self-propelled vehicle 1 for conveyance, the command rotational speeds from the stop control device 10 to the respective drive motors 12 and 12 (the respective driving wheels 6 and 7) are changed from those in the stop mode (0 rpm for both the left and right driving wheels 6 and 7) to, for example, 30% of the actually measured rotational speed for the left driving wheel 6, and for example, 70% of the actually measured rotational speed for the right driving wheel 7. After that, the process returns to the fifth step S5 so as to determine whether or not there is a positional deviation of the self-propelled vehicle 1 for conveyance from the predetermined route. Based on a result of the determination, the process proceeds to the subsequent sixth step S6 (in which the positional deviation is corrected) or to the seventh step S7 (in which intermittent brake control during deceleration is executed).

In the seventh step S7, a release signal is transmitted from the stop control device 10 to the electric brakes and the respective disc brakes 8 and 8 to release the electric brakes and the respective disc brakes 8 and 8. At the same time, in order to gently decelerate the self-propelled vehicle 1 for conveyance, the command rotational speeds from the stop control device 10 to the respective drive motors 12 and 12 (the respective driving wheels 6 and 7) are changed from those in the stop mode (0 rpm for both the left and right driving wheels 6 and 7) to, for example, 50% of the actually measured rotational speed for the left driving wheel 6, and for example, 50% of the actually measured rotational speed for the right driving wheel 7. Then, during deceleration, the electric brakes and the respective disc brakes 8 and 8 are intermittently (e.g., three times in total at intervals of 0.1 seconds) operated. After that, the process returns to the first step S1 again so as to change the command rotational speeds from the stop control device 10 to the respective drive motors 12 and 12 (the respective driving wheels 6 and 7) to those in the stop mode (0 rpm for both the left and right driving wheels 6 and 7). An operation signal is then transmitted from the stop control device 10 to the electric brakes and the respective disc brakes 8 and 8 to operate the electric brakes and the respective disc brakes 8 and 8 again. After the lapse of a predetermined time is confirmed, the process proceeds to the subsequent second step S2.

Figure 6:
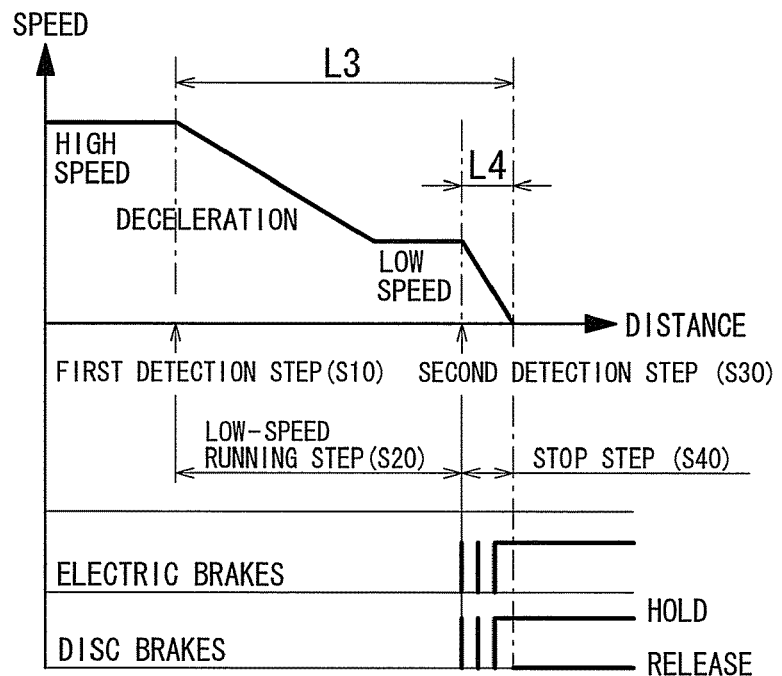
FIG. 6 is a view showing a relationship between speed and distance and operation modes of various brakes in the case where the method of controlling the stop of the self-propelled vehicle for conveyance according to the embodiment of the present invention is adopted.

Then, when the respective actually measured rotational speeds of the respective driving wheels 6 and 7 finally become equal to 0 rpm in the second step S2, the process proceeds to an eighth step S8 to complete the stop. After the self-propelled vehicle 1 for conveyance has been stopped, it is preferable to continue to operate the electric brakes as shown in FIG. 6, and the respective disc brakes 8 and 8 may either clamp or release the discs.

As described above, in the stop step S40, when there arises a positional deviation of the self-propelled vehicle 1 for conveyance, the braking operation of the respective disc brakes 8 and 8 and the electric brakes is temporarily released to correct the positional deviation. After that, the flow of operating the respective disc brakes 8 and 8 and the electric brakes again is repeated to stop the self-propelled vehicle 1 for conveyance in such a manner as to prevent a leftward or rightward positional deviation thereof from the predetermined route. Further, when the vehicle speed (the actually measured rotational speed) of the self-propelled vehicle 1 for conveyance is higher than a reference value and there is no leftward or rightward positional deviation of the self-propelled vehicle 1 for conveyance from the predetermined route (when the seventh step S7 of FIG. 4 is reached), the disc brakes 8 and 8 and the electric brakes are intermittently operated (as indicated by rising parts of thick lines showing operation modes of the electric brakes and the disc brakes 8 and 8 in FIG. 6) after deceleration. Therefore, the respective driving wheels 6 and 7 are prevented from being locked to slip to the extent of disabling the posture control of the self-propelled vehicle 1 for conveyance.

It should be noted in this stop control method that the process proceeds to an emergency stop step S50 as shown in FIG. 3 when the self-propelled vehicle 1 for conveyance does not stop in front of the obstacle 3 for some reason in the aforementioned stop step S40.

In the emergency stop step S50, when the self-propelled vehicle 1 for conveyance cannot stop in front of the obstacle 3 and the safety bumper 11 of the self-propelled vehicle 1 for conveyance comes into contact with the obstacle 3, the contact detection circuit in the safety bumper 11 is short-circuited to cause a change in the resistance value in the contact detection circuit. In response to the detection of this change in the resistance value, the transmission of power to the self-propelled vehicle 1 for conveyance is shut off to completely stop the self-propelled vehicle 1 for conveyance. However, owing to the processing of the stop step S40, deceleration of the self-propelled vehicle 1 for conveyance is advanced, and thus stops at a shorter braking distance than before. It should be noted that the power to the self-propelled vehicle 1 for conveyance is completely stopped after the self-propelled vehicle 1 for conveyance has come into contact with the obstacle 3 and stopped. Thus, the electric brakes are released. Besides, since the power is shut off while one of the first to seventh steps S1 to S7 of the stop step S40 is being carried out, the self-propelled vehicle 1 for conveyance is stopped with the discs either clamped or released by the respective disc brakes 8 and 8.

As described above, according to the embodiment of the present invention, the leftward or rightward positional deviation of the self-propelled vehicle 1 for conveyance from the predetermined route is correctively controlled in the state where the electric brakes and respective disc brakes 8 and 8 (brake means) for the respective driving wheels 6 and 7 are temporarily released especially in the stop step S40 of this stop control method. Therefore, the self-propelled vehicle 1 for conveyance is safely stopped without deviating from the predetermined route.

Further, according to the embodiment of the present invention, in the stop step S40 of this stop control method, especially when the vehicle speed of the self-propelled vehicle 1 for conveyance is higher than the reference value and there is no leftward or rightward positional deviation of the self-propelled vehicle 1 for conveyance from the predetermined route (when the seventh step S7 of FIG. 4 is reached), the electric brakes and respective disc brakes 8 and 8 for the respective driving wheels 6 and 7 are intermittently operated after deceleration. Therefore, the respective driving wheels 6 and 7 are prevented from being locked to slip to the extent of disabling the posture control of the self-propelled vehicle 1 for conveyance, and it is possible to make a stop braking distance L3 (see FIG. 6) of the self-propelled vehicle 1 for conveyance after the detection of the obstacle 1 shorter than the stop braking distance in the stop control method of related art.

Furthermore, according to the embodiment of the present invention, the low-speed running step S20 is provided between the first detection step S10 and the stop step S40 in this stop control method. Therefore, this method is especially effective when the self-propelled vehicle 1 for conveyance is caused to run at a high speed. The self-propelled vehicle 1 for conveyance running at the high speed can be sufficiently decelerated prior to the stop step S40, and the slipping effect of the respective driving wheels 6 and 7 when operating the brakes in the stop step S40 can be prevented to the utmost. Besides, the second detection step S30 of detecting the obstacle 3 when the distance therefrom becomes close to the second set distance L2 is provided between the low-speed running step S20 and the stop step S40, and the second set distance L2 (see FIG. 1) is set slightly longer than the stop braking distance L4 (see FIG. 6) in the stop step S40. Therefore, the self-propelled vehicle 1 for conveyance can be stopped in front of the obstacle 3 without coming into contact with the obstacle 3.

Still further, according to the embodiment of the present invention, after the stop step S40, this stop control method includes, as a failsafe function regarding stop control, the emergency stop step S50 of shutting the transmission of the power to the self-propelled vehicle 1 for conveyance to stop the self-propelled vehicle 1 for conveyance as soon as the safety bumper 11 of the self-propelled vehicle 1 for conveyance comes into contact with the obstacle 3 in the case where the self-propelled vehicle 1 for conveyance does not stop in front of the obstacle 3 in the stop step S40. Therefore, in the case where the self-propelled vehicle 1 for conveyance does not stop in front of the obstacle 3 for some reason, the self-propelled vehicle 1 for conveyance can be stopped as soon as the safety bumper 11 of the self-propelled vehicle 1 for conveyance comes into contact with the obstacle 3. As a result, safety can further be enhanced.

It should be noted that the stop control method according to the embodiment of the present invention includes the second detection step S30 as a guide for carrying out the stop step S40 between the low-speed running step S20 and the stop step S40 and that this mode is most preferable. Otherwise, however, it is also appropriate to set a duration time of the low-speed running step S20 in advance and carry out the stop step S40 upon the lapse of the time, or to carry out the stop step S40 as soon as the command speed for the self-propelled vehicle 1 for conveyance in the low-speed running step S20 coincides with an actual speed thereof.

Further, in the stop control method according to the embodiment of the present invention, the low-speed running step S20 and the second detection step S30 are provided between the first detection step S10 and the stop step S40, and the self-propelled vehicle 1 for conveyance running at the high speed can be sufficiently decelerated prior to the stop step S40. However, in the case where the self-propelled vehicle 1 for conveyance does not always run at the high speed, it is also appropriate to omit the low-speed running step S20 and provide the stop step S40 after the first detection step S10 or the second detection step S30.

Furthermore, in the embodiment of the present invention, both the disc brakes 8 and 8 designed as mechanical brakes and the electric brakes are adopted as the brake means for the respective driving wheels 6 and 7. However, it is also appropriate to adopt either the disc brakes 8 and 8 or the electric brakes.

The invention claimed is:

1. A method of controlling a stop of a self-propelled vehicle for conveyance that is equipped with a pair of left and right driving wheels, drive motors coupled to the respective driving wheels, and brake devices for braking rotation of the respective driving wheels, is removably or integrally coupled to a carriage, and runs in a self-propelled manner along a guide device disposed on a predetermined route, the method comprising:

detecting an obstacle located at a set distance while the self-propelled vehicle for conveyance is running; and
stopping the self-propelled vehicle for conveyance, the stop step including:
operating the brake devices and electric brakes realized by the drive motors on a basis of detection of the obstacle in the detection step,
detecting a leftward or rightward positional deviation of the self-propelled vehicle for conveyance from the predetermined route, and
correcting the positional deviation by temporarily releasing operation of the brake devices and the electric brakes realized by the drive motors and making command rotational speeds for the respective drive motors different from each other when the positional deviation is detected.

2. The method of controlling the stop of the self-propelled vehicle for conveyance according to claim 1, wherein the stop step further includes temporarily releasing the operation of the brake devices and the electric brakes realized by the drive motors and then intermittently operating the brake devices and the electric brakes realized by the drive motors in the state where the self-propelled vehicle for conveyance is decelerated when differences between actually measured rotational speeds of the respective driving wheels and the command rotational speeds for the respective drive motors are larger than a reference value and the positional deviation is not detected.

3. The method of controlling the stop of the self-propelled vehicle for conveyance according to claim 1, the method further comprising:
a long distance-side detection step that detects the obstacle at a set distance longer than the set distance in the detection step; and
causing the self-propelled vehicle for conveyance to run at a low speed by decelerating the self-propelled vehicle for conveyance based on detection of the obstacle in the long distance-side detection step.

4. The method of controlling the stop of the self-propelled vehicle for conveyance according to claim 1, wherein, in the step of correcting the positional deviation, the positional deviation is corrected by setting the command rotational speeds for the respective drive motors lower than actually measured rotational speeds and making the command rotational speeds for the respective drive motors different from each other when differences between the actually measured rotational speeds of the respective driving wheels and the command rotational speeds for the respective drive motors are larger than a reference value.

5. The method of controlling the stop of the self-propelled vehicle for conveyance according to claim 1, wherein, in the step of correcting the positional deviation, the positional deviation is corrected by setting the command rotational speed for one of the drive motors to zero and setting the command rotational speed for the other drive motor lower than an actually measured rotational speed thereof when differences between actually measured rotational speeds of the respective driving wheels and the command rotational speeds for the respective drive motors are smaller than a reference value.

6. The method of controlling the stop of the self-propelled vehicle for conveyance according to claim 1, the method further comprising: making an emergency stop of the self-propelled vehicle for conveyance by shutting off transmission of power to the self-propelled vehicle for conveyance when the self-propelled vehicle for conveyance comes into contact with the obstacle without stopping in front of the obstacle through the stop step.

7. A self-propelled vehicle for conveyance that is removably or integrally coupled to a carriage and runs in a self-propelled manner along a guide device disposed on a predetermined route, the vehicle comprising:
a pair of left and right driving wheels that rotate independently of each other;
drive motors coupled to the respective driving wheels;
brake devices that brake rotation of the respective driving wheels;
an obstacle detection sensor that detects an obstacle located at a predetermined distance;
a positional deviation detection sensor that detects a leftward or rightward positional deviation of the self-propelled vehicle for conveyance from the predetermined route; and
a stop control device that operates the brake devices and electric brakes realized by the drive motors on a basis of detection of the obstacle by the obstacle detection sensor, and corrects a leftward or rightward positional deviation of the self-propelled vehicle for conveyance from the predetermined route by temporarily releasing operation of the brake devices and the electric brakes realized by the drive motors and making command rotational speeds for the respective drive motors different from each other and stops the self-propelled vehicle for conveyance when the positional deviation detection sensor detects the positional deviation.

8. The self-propelled vehicle for conveyance according to claim 7, wherein the positional deviation detection sensor is provided at a front or rear portion, in a traveling direction, of a driving wheel unit in which the driving wheels are integrally formed, and is constructed by arranging in series a plurality of detection elements for detecting the guide device substantially perpendicularly to a direction in which the guide device extends.

* * * * *

UNITED STATES PATENT AND TRADEMARK OFFICE
CERTIFICATE OF CORRECTION

| | | |
|---|---|---|
| PATENT NO. | : 8,267,834 B2 | Page 1 of 1 |
| APPLICATION NO. | : 12/740420 | |
| DATED | : September 18, 2012 | |
| INVENTOR(S) | : Hiroyoshi Baba | |

It is certified that error appears in the above-identified patent and that said Letters Patent is hereby corrected as shown below:

In the Specifications:

| Column | Line | |
|---|---|---|
| 3 | 1 | Change "and nm" to --and run--. |
| 4 | 19 | After "described" insert --in--. |

Signed and Sealed this
Eighth Day of January, 2013

David J. Kappos
*Director of the United States Patent and Trademark Office*